United States Patent
Desarzens et al.

(10) Patent No.: US 11,194,890 B2
(45) Date of Patent: Dec. 7, 2021

(54) SYSTEM FOR DECRYPTING AND RENDERING CONTENT

(71) Applicant: NAGRAVISION S.A., Cheseaux-sur-Lausanne (CH)

(72) Inventors: Philippe Desarzens, Bussigny (CH); Fabien Gremaud, Chatel-St-Denis (CH); Jean-Luc Bussy, Cossonay-Ville (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 154 days.

(21) Appl. No.: 16/331,854

(22) PCT Filed: Sep. 8, 2017

(86) PCT No.: PCT/EP2017/072564
§ 371 (c)(1),
(2) Date: Mar. 8, 2019

(87) PCT Pub. No.: WO2018/046649
PCT Pub. Date: Mar. 15, 2018

(65) Prior Publication Data
US 2019/0236245 A1 Aug. 1, 2019

(30) Foreign Application Priority Data
Sep. 9, 2016 (EP) .................................. 161888205

(51) Int. Cl.
*G06F 21/16* (2013.01)
*G06F 21/10* (2013.01)
*G06F 21/62* (2013.01)

(52) U.S. Cl.
CPC .............. *G06F 21/16* (2013.01); *G06F 21/10* (2013.01); *G06F 21/6209* (2013.01); *G06F 2221/0797* (2013.01)

(58) Field of Classification Search
CPC ...... G06F 21/16; G06F 21/10; G06F 21/6209; G06F 2221/0797
(Continued)

(56) References Cited

U.S. PATENT DOCUMENTS 6,985,591 B2 * 1/2006 Graunke ............... H04L 9/0838
380/277
10,762,229 B2 * 9/2020 Sion .................... G06F 21/6218
(Continued)

FOREIGN PATENT DOCUMENTS

EP 2 802 152 A1 11/2014

OTHER PUBLICATIONS

International Search Report dated Oct. 12, 2017 in PCT/EP2017/072564 filed on Sep. 8, 2017.

*Primary Examiner* — James D Nigh
(74) *Attorney, Agent, or Firm* — Oblon, McClelland, Maier & Neustadt, L.L.P.

(57) ABSTRACT

A system for rendering a content, the rendering of which is subject to conditional access security conditions. The system includes a host device and a detachable security device, the security device configured to decrypt the encrypted content, re-encrypt it under a local key and to deliver the re-encrypted content to the host device while ensuring that the host device applies or otherwise enforces any conditions associated with the rendering of the content.

14 Claims, 1 Drawing Sheet

(58) Field of Classification Search
USPC .......................................................... 713/176
See application file for complete search history.

(56) References Cited

U.S. PATENT DOCUMENTS

| | | | |
|---|---|---|---|
| 2003/0159037 A1* | 8/2003 | Taki | G11B 20/00253 |
| | | | 713/168 |
| 2004/0133794 A1* | 7/2004 | Kocher | H04L 9/3236 |
| | | | 713/193 |
| 2006/0109982 A1* | 5/2006 | Puiatti | H04N 7/1675 |
| | | | 380/200 |
| 2008/0154775 A1* | 6/2008 | Soukup | H04L 63/0464 |
| | | | 705/51 |
| 2009/0038016 A1* | 2/2009 | Epstein | G11B 20/00086 |
| | | | 726/27 |
| 2011/0299680 A1 | 12/2011 | Vembu et al. | |
| 2011/0311056 A1* | 12/2011 | Winograd | H04L 9/08 |
| | | | 380/287 |
| 2012/0079270 A1 | 3/2012 | Patel | |
| 2012/0246462 A1 | 9/2012 | Moroney et al. | |
| 2014/0281481 A1 | 9/2014 | Moroney | |
| 2014/0373042 A1 | 12/2014 | Le Pelerin | |
| 2019/0087432 A1* | 3/2019 | Sion | H04L 63/0428 |
| 2019/0384920 A1* | 12/2019 | Kludy | H04L 63/06 |

\* cited by examiner

SYSTEM FOR DECRYPTING AND RENDERING CONTENT

TECHNICAL DOMAIN

The present disclosure relates generally to the domain of secure digital media content decryption and is of particular use in allowing an operator of conditional access content to ensure that a media player enforces any conditions associated with the rendering of such content.

BACKGROUND

Systems for limiting access to certain digital media content to only those who have acquired the rights to do so are known in the state of the art. These include systems having a host device for receiving the content and a conditional access module (CAM) which, when inserted into or otherwise connected to the host device, decrypt the content received from the host device on condition that the CAM has access to the necessary rights thereby proving that the rights have been acquired, and return the decrypted content to the host device for rendering.

Host devices in the form of a digital TV are known. These have a standard interface known as a Common Interface (CI), usually at the end of a slot into which a conditional access module or Common Interface Conditional Access Module (CICAM) may be plugged. The CICAM may be configured to receive a smartcard or a security module in which rights acquired by a user to pay-TV services are stored. The CICAM with its security module controls the decrypting of the services for which the user has subscribed. Decrypted content is returned to the host via the Common Interface.

A system known as CI Plus is also available in the state of the art. This system is similar to CI except that the decrypted content is re-encrypted by the CICAM before being sent back to the host device in order to prevent an unscrupulous party from intercepting the decrypted content on its way back to the host device and using it or redistributing it illegally. The key that is used by the CICAM to re-encrypt the content is sent to the host from the CICAM via a secure channel formed between the host and the CICAM over the Common Interface.

The CI and CI Plus standards make use of a physical interface between the host and the CICAM which is based on a standard introduced by the Personal Computer Memory Card International Association called PCMCIA. Other physical interfaces have been used such as USB for example, which offers advantages of higher data transfer rates. However the USB standard was not designed specifically for conditional access applications, care has to be taken to maintain the required level of security.

BRIEF DESCRIPTION OF THE DRAWINGS

The drawings accompanying the present written disclosure illustrate.

DETAILED DESCRIPTION

Figure 1:
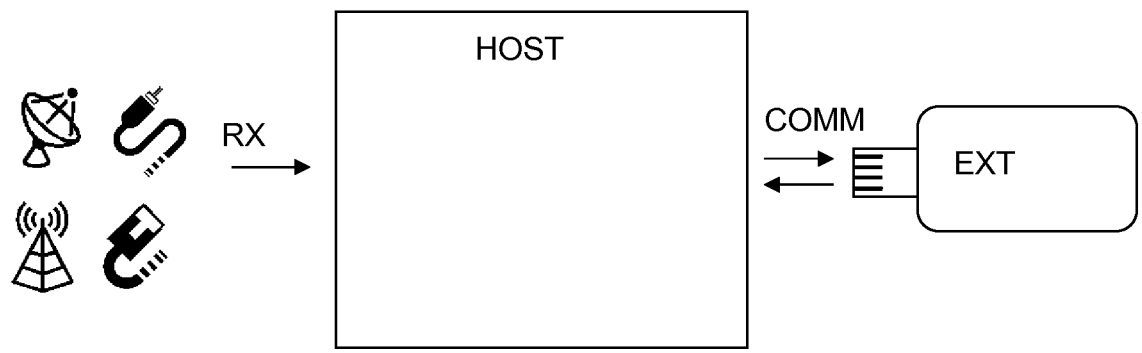
FIG. 1: components used in an embodiment of the present invention.
Figure 2:
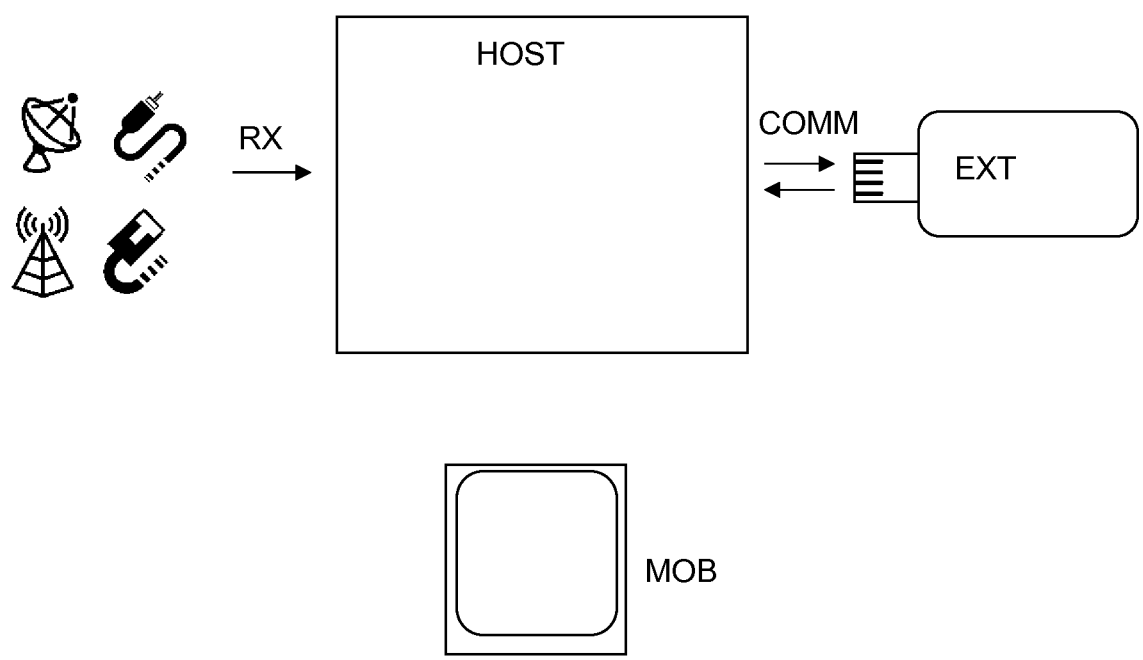
FIG. 2: further components which may be used in another embodiment of the present invention.

According to a first aspect, provision is made for a digital media player, such as a digital TV, to play media content which is encrypted and with which certain security requirements or conditions are associated. This is done by providing a detachable external device, which may be attached to the media player, the external device serving to decrypt, re-encrypt the content before sending the re-encrypted content back to the host TV, and to ensure that the TV respects any conditions associated with the rendering of the content. The security requirements associated with the content are received by the external device along with the encrypted content with which they are associated and these are encrypted by the external device and sent back in a security message to the host TV. The security requirements, or conditions, may be for example a set of usage rules (e.g. analog output not authorized) or a visible mark such as a logo has to be displayed along with the content or an invisible mark such as a watermark has to be inserted into the content after decoding (or in some cases before decoding) by the host TV.

It can be said that the content is decrypted in the external security device and consumed in the host device, where any security conditions associated with the content are handled by the host device. It is therefore important that the security device and the host cooperate in ensuring that the security conditions are enforced when the content is consumed (for example, rendered). The security device decrypts the content in keeping with rights associated with the content, the rights being stored in the security device, as is the normal procedure in state of the art pay-TV. According to embodiments of the invention, any security conditions associated with the consumption of the content are properly handled by the host device to which the external security device is connected.

Accordingly, provision is made for a system for decrypting and rendering content whose rendering is subject to at least one predetermined condition, comprising:
- a host device for rendering the decrypted content; and
- a security device external to the host device and connectable thereto via a communications interface between the two devices;

the security device being configured to:
- decrypt content received from the host device, via the communications interface, using decryption keys provided within the encrypted content;
- create on the communications interface, in cooperation with the host device, a secure communications channel between both devices;
- re-encrypt the content using a locally-generated content key; and
- return the re-encrypted content to the host device via the communications interface;
- transfer a message to the host device, via the secure communications channel, the message comprising the content key;

characterised in that:
the security device is further configured to:
- include in the message the predetermined condition associated with the content; and
- encrypt the message before transferring it to the host device, using a root key which is shared with the host device; and the host device is configured to:
- decrypt the message using the root key to reveal the content key and the condition associated with the content;
- decrypt the re-encrypted content using the content key; and
- render the content while enforcing the predetermined condition associated with the content.

According to another aspect, there is provided a host device for rendering content whose rendering is subject to at least one predetermined condition, comprising:
  a decoder;
  a decryption module;
  a communications interface for communicating with an external device;
the host device configured to:
  send a received encrypted content to the external device for decryption;
  receive a re-encrypted version of the decrypted content via the communications interface;
  establish, over the communications interface, a secure communications channel with the external device;
  receive a message from the external device, the message comprising a content key for decrypting the re-encrypted version of the content; and
  decrypt, decode and render the re-encrypted message;
characterised in that the host device further comprises a secure memory for holding a root key, the received message being encrypted under the root key and further comprising the predetermined condition for rendering the content, the host device further configured to:
  decrypt the message using the root key to reveal the content key and the condition associated with the content;
  decrypt the re-encrypted content using the content key; and
  enforce the condition associated with the content while rendering the content.

According to still a further aspect, provision is made for a security device for decrypting content received from a host device and returning the decrypted content to the host device, comprising:
  a communications interface module having a port for connecting to a compatible port on the host device;
  a cryptographic module for calculating cryptographic keys and for performing encryption and decryption functions;
  a secure memory for storing cryptographic keys;
wherein the security module is configured to:
  re-encrypt the decrypted content under a locally-generated content key before returning the re-encrypted content to the host device via the port; and
  send a message to the host device over a secure communications channel via the port, the message comprising the host key;
characterised in that the security device is further configured to:
  include in the message a condition, the condition received with the content received from the host device, the condition specifying one or more rules which are to be met by the host when rendering the content, the message being encrypted under a root key before being sent to the host device, the root key being share with the host device.

FIG. 1 shows a number of components which may be used in a system according to an embodiment of the present invention. A host device such as a digital television, a personal video recorder or a media player, can receive conditional access content from a source such a satellite or from the Internet and may have a cable connection, a USB port or HDMI port etc. The content is generally received in encrypted format including encrypted control words for decrypting the content, the control words being encrypted by a transport key. As well as the encrypted control words, the encrypted content also includes one or more conditions which have to be met by a host device which renders the content.

The host device has a port such as a USB or HDMI port for example, to which an external device may be attached. An external device with a port compatible with that of the host device is also provided. The external device has cryptographic functionality and so may be called a security device. The security device may come in the form of a dongle. The security device receives the encrypted content from the host device via the port and using the transport key, which may be stored in a secure memory, finds control words. The security module uses the control words to decrypt the content. The decrypted content is then re-encrypted using a content key generated locally by the security device and the re-encrypted content is sent back to the host device via the port so that the host device, which is in charge of rendering the content.

In order for the host device to be able to decrypt the re-encrypted content, the security device sends a message to the host device, the message comprising the local content key. To do this in a secure manner, a secure communications channel is established over the communications interface between the two devices. Through the secure channel the devices are able to authenticate each other and to exchange messages in a secure and authenticated manner.

The rendering of the content must be done according to some conditions set by the provider of the content. The conditions are those which were conveyed within the encrypted content, which must be complied with by the rendering device, in this case the host device. The conditions may be for example, that the host device is not allowed to provide an analogue version of the digital content. Another condition may be that a visible mark, such as a logo, must be displayed at a certain position along with the content. Yet another example of a condition which is required to be enforced is that an invisible mark, such as a watermark, is to be inserted into the content after it is decoded and before it is displayed. Other conditions associated with the rendering of the content are also possible and it is an object of the present invention to provide a guarantee that hosts devices comply with those conditions when rendering the content.

According to an embodiment, in order to ensure that the host device receives the conditions associated with the rendering of the content (otherwise known as the security conditions), the message that the security device sends to the host device further comprises the security conditions. In order to ensure that the security conditions remain bound to the local content key, thereby guaranteeing that the security conditions cannot be modified, the message which is generated by the security device is then encrypted (by the security device) using a root key shared with the host device.

In the domain of computing, operations are performed using a mix of hardware, firmware and software components at various layers of abstraction. In the domain of security processing, security functions may be rooted in software, however since software may be tampered with easier than hardware, the level of trust in such software rooted functions is rather low. Consequently, hardware roots of trust exist, upon which trustworthiness of a security mechanism can be based. A hardware root of trust is a highly reliable piece of hardware used as a basis for critical security functions. A hardware root of trust us secure by design, thereby ensuring that they cannot be tampered with by malware, and thus providing a firm foundation upon which to build security and trust.

According to a preferred embodiment, providing maximum security, the host device comprises a hardware root of trust and the root key is shared between the security module and the hardware root of trust. In some embodiments the security module may also comprise a hardware root of trust for this purpose.

When the security module is plugged into the host device, security protocols are run between the two devices, preferably involving hardware roots of trust, so that security certificates and authentication information can be exchanged in order to be able to create the secure channel between the host device and the security device.

Once the host device receives the encrypted message from the security device, the host device decrypts the message with the root key, thereby recovering the local content key and the conditions associated with the rendering of the content, which is securely bound to the content key. The host device then decrypts the re-encrypted content using the local content key and renders the decrypted content while enforcing the condition or conditions associated with the rendering of the content.

Whenever the security device detects a change in security conditions accompanying the encrypted content coming from the host device, the security device then generates a new local content key for re-encrypting the respective content. For this reason it can be said that the local content key is a volatile key. The security module then creates a new message for the host device, comprising the new local content key and the new security conditions, encrypts the message using the root key shared with the host device and transmits the message to the host device. This ensures that the new security conditions are enforced thanks to the new content key, such that if the new message is tampered with or otherwise removed, the host device will not have the correct content key and will be able to decrypt the re-encrypted content.

Host devices preferably have a hardware root of trust (HWRT), thus allowing for a high level of security for enforcing the fulfillment of security conditions accompanying content according to embodiments of the present invention. However, according to another embodiment, the goal may still be realised when the host device does not have a hardware root of trust as described above. Host devices generally have some kind of security built in. In general terms it can be said that the host device has a trusted execution environment (TEE). A TEE is a secure, integrity-protected processing environment, consisting of processing, memory, and storage capabilities. It is isolated from the "normal" processing environment, sometimes called the rich execution environment (REE), where the device operating system and applications run. The term "rich" refers to the extensive functionality and, hence, the increased attack surface, in mass market operating systems today. TEEs enable improved security and usability for REE applications by ensuring that sensitive operations are restricted to the TEE and sensitive data, such as cryptographic keys, never leave the TEE. In a host device which has no HWRT, the enforcement of the security conditions is assured on the TEE level. Finally for host devices with no TEE, the security conditions enforcement may be assured using suitably adapted secure software.

The invention claimed is:

1. A host device for rendering content whose rendering is subject to at least one predetermined condition, comprising:
a decoder;
a decryption module;
a communications interface for communicating with an external device;
the host device including:
a security memory configured to store a root key, and processing circuitry configured to:
send a received encrypted content to the external device for decryption as decrypted content;
receive a re-encrypted version of the decrypted content via the communications interface as re-encrypted content;
establish, over the communications interface, a secure communications channel with the external device;
receive a message from the external device, the message including the at least one predetermined condition for rendering the content and a content key for decrypting the re-encrypted version of the content, wherein the received message is encrypted under the root key;
decrypt the received message using the root key to reveal the content key and the at least one predetermined condition associated with the content;
decrypt, decode, and render the re-encrypted content using the content key;
and
enforce the condition associated with the content while rendering the content.

2. A security device for decrypting content received from a host device and returning the decrypted content to the host device, comprising:
a communications interface having a port connecting to a compatible port on the host device;
cryptographic circuitry configured to calculate cryptographic keys and to perform encryption and decryption functions;
a secure memory storing cryptographic keys;
processing circuitry is configured to:
re-encrypt the decrypted content under a locally-generated content key before returning the re-encrypted content to the host device via the port; and
send a message to the host device over a secure communications channel via the port, the message including a host key and a condition, the condition received with the content received from the host device, the condition specifying one or more rules which are met by the host device when rendering the content, the message being encrypted under a root key before being sent to the host device, the root key shared with the host device.

3. A system for decrypting and rendering content whose rendering is subject to at least one predetermined condition, comprising:
a host device rendering the decrypted content; and
a security device external to the host device and connectable thereto via a communications interface between the security device and the host device;
the security device including first processing circuitry configured to:
decrypt content received from the host device, via the communications interface, using decryption keys provided within encrypted content;
create on the communications interface, in cooperation with the host device, a secure communications channel between both devices;
re-encrypt the content using a locally-generated content key;
return the re-encrypted content to the host device via the communications interface;

encrypt a message using a root key shared with the host device; and transfer the message to the host device, via the secure communications channel, the message including the content key and the predetermined condition associated with the content;

and the host device including second processing circuitry configured to:

decrypt the message using the root key to reveal the content key and the condition associated with the content;

decrypt the re-encrypted content using the content key; and render the content while enforcing the predetermined condition associated with the content.

4. The system according to claim 3, wherein the predetermined condition is included in the encrypted content and discovered by the security device during said decryption of the content.

5. The system according to claim 3, wherein the security device is further configured such that the decryption performed therein is subject to availability in the security device of one or more predetermined rights for decrypting the content.

6. The system according to claim 3, the security device and the host device both comprising a port for establishing the communications interface, the ports conforming to one of a USB standard or an HDMI standard.

7. The system according to claim 3, wherein the communications secure channel is an authenticated channel.

8. The system according to claim 3, wherein the host device further comprising a hardware root of trust for storing the root key or for performing the decryption or enforcement of the predetermined condition.

9. The system according to claim 8, wherein the security device also further comprises a hardware root of trust, the establishment of the secure communications channel being negotiated by the respective hardware roots of trust.

10. The system according to claim 3, wherein the predetermined condition is that the content is to be rendered along with a visible mark, the host device further configured to insert the visible mark when rendering the content.

11. The system according to claim 3, wherein the predetermined condition is that the content is to be rendered along with an invisible mark, the host device being further configured to insert the invisible mark after the content is decoded.

12. The system according to claim 3, wherein the security device is further configured to generate a new content key whenever a new predetermined condition is received, thereby providing the host device with a new encrypted message comprising the new content key and the new predetermined condition.

13. A security device for decrypting content received from the host device according to claim 1 and returning the decrypted content to the host device, comprising:

a communications interface having a port connecting to a compatible port on the host device;

cryptographic circuitry configured to calculate cryptographic keys and to perform encryption and decryption functions;

a secure memory storing cryptographic keys;

processing circuitry configured to:

re-encrypt the decrypted content under a locally-generated content key before returning the re-encrypted content to the host device via the port; and send a message to the host device over a secure communications channel via the port, the message including a host key and a condition, the condition received with the content received from the host device, the condition specifying one or more rules which are met by the host device when rendering the content, the message being encrypted under a root key before being sent to the host device, the root key being shared with the host device.

14. A system for decrypting and rendering content whose rendering is subject to at least one predetermined condition, comprising:

the host device according to claim 1 rendering the decrypted content; and a security device external to the host device and connectable thereto via a communications interface therebetween;

the security device including first processing circuitry configured to:

decrypt content received from the host device, via the communications interface, using decryption keys provided within the encrypted content;

create on the communications interface, in cooperation with the host device, a secure communications channel between both devices;

re-encrypt the content using a locally-generated content key;

return the re-encrypted content to the host device via the communications interface;

encrypt a message using a root key shared with the host device; and transfer the message to the host device, via the secure communications channel, the message comprising the content key and the predetermined condition associated with the content; and the host device including second processing circuitry configured to:

decrypt the message using the root key to reveal the content key and the condition associated with the content;

decrypt the re-encrypted content using the content key; and render the content while enforcing the predetermined condition associated with the content.

\* \* \* \* \*